United States Patent
Eckel et al.

[11] Patent Number: 5,884,735
[45] Date of Patent: Mar. 23, 1999

[54] SPEED-ADAPTIVE VIBRATION DAMPENER

[75] Inventors: Hans-Gerd Eckel, Laudenbach; Anja Kunkel, Siedelsbrunn, both of Germany

[73] Assignee: Carl Freudenberg, Weinheim, Germany

[21] Appl. No.: 792,584

[22] Filed: Jan. 30, 1997

[30]  Foreign Application Priority Data

Feb. 6, 1996 [DE] Germany ................. 196 04 160.0

[51] Int. Cl.$^6$ .................................................. F16F 15/131
[52] U.S. Cl. ........................... 188/378; 74/574; 267/136
[58] Field of Search ............................ 188/268, 378–380, 188/218 A; 267/136; 74/574, 572, 573 R; 76/604; 464/180; 416/145, 500

[56]      References Cited

U.S. PATENT DOCUMENTS

| | | | |
|---|---|---|---|
| 2,029,796 | 2/1936 | Salomon | 74/574 |
| 2,079,226 | 5/1937 | Sarazin | 74/574 |
| 2,184,734 | 12/1939 | Chilton | 74/574 |
| 2,272,189 | 2/1942 | De Pew | 74/574 |
| 2,306,959 | 12/1942 | Knibbe | 74/604 |
| 2,332,072 | 10/1943 | Gregory et al. | 74/604 |
| 2,348,941 | 5/1944 | Ware | 74/574 |
| 2,379,255 | 6/1945 | Rubissow | 74/574 |
| 2,387,776 | 10/1945 | Salomon . | |
| 3,874,818 | 4/1975 | Saunders et al. | 416/500 |
| 4,218,187 | 8/1980 | Madden | 416/500 |
| 4,653,169 | 3/1987 | Puszakowski | 76/574 |
| 4,736,679 | 4/1988 | Berger et al. | 74/574 |
| 5,188,002 | 2/1993 | Wolf et al. | 74/574 |
| 5,269,197 | 12/1993 | Yang | 74/574 |
| 5,352,157 | 10/1994 | Ochs et al. | 464/180 |
| 5,495,924 | 3/1996 | Shaw et al. | 188/378 |
| 5,605,078 | 2/1997 | Taylor et al. | 74/574 |
| 5,666,862 | 9/1997 | Eckel et al. | 74/574 |

FOREIGN PATENT DOCUMENTS 598811  2/1948  United Kingdom .

*Primary Examiner*—Douglas C. Butler
*Attorney, Agent, or Firm*—Milde, Hoffberg & Macklin, LLP

[57]      ABSTRACT

A vibration dampener adapts to different speeds of rotation. The device comprises a drive collar (1) and several inertial masses (2). The collar rotates around a central axis (3) and the inertial masses pivot around peripheral axes along the direction of rotation. Each inertial mass is secured to the collar by two bolts (5). The bolts, which extend parallel the central axis, are distributed around the circumference of the collar, and roll back and forth along arcs (6). The arcs are concave toward the central axis in the vicinity of the collar and concave in the opposite direction in the vicinity of the inertial masses. The bolts extend through a guide (7) toward the sides facing away from the associated arcs.

10 Claims, 2 Drawing Sheets

SPEED-ADAPTIVE VIBRATION DAMPENER

BACKGROUND OF THE INVENTION

The present invention concerns a vibration dampener that adapts to different speeds of rotation. The device comprises a hub or "drive collar" and several inertial masses. The drive collar rotates around a central axis and the inertial masses pivot about peripheral axes in the direction of rotation. Each inertial mass is secured to the collar by two bolts. The bolts are parallel to the central axis and are distributed around the circumference of the collar. The bolts roll back and forth along arcs. The arcs are concave toward the central axis in the vicinity of the collar and concave in the opposite direction in the vicinity of the inertial masses.

A vibration dampener of this type is known from the British Patent No. 598 811. In this device the arcs consist of sections of bore walls. The bores are considerably wider than the bolts. In the event of vibration, the bolts roll over the walls, continuously varying the distance between each inertial mass and the central axis during the course of each individual vibration. Since the frequencies inherent in such a vibration dampener are proportional to the speed of rotation, vibrations with frequencies that are also proportional thereto can be eliminated over the whole range of speeds. All cyclically operating machinery, motor vehicle internal combustion engines for example, exhibit such speed proportional frequencies.

The bolts and arcs in this known speed-adaptive vibration dampener are forced toward each other as long as the shaft turns. The inertial masses all revolve around, and are located as far from the central axis as possible as long as the shaft continues to rotate at a constant speed. This state is disrupted, however, when the shaft stops rotating. All of the components then shift, subject to gravity, as far downward toward the earth's center as possible. The inertial masses and bolts distributed around the device will accordingly differ in distance from the central axis.

When speed-adaptive vibration dampeners stop rotating, the transition from motion to rest is unpleasantly apparent when the inertial masses on the other side of the shaft from the earth's center plummet suddenly downward and the bolts collide against whatever section of the metal bore wall confronts them. The result is a loud clang. A similar phenomenon (and noise) accompanies the transition from rest to motion.

SUMMARY OF THE INVENTION

The principal object of the present invention is to provide a speed-adaptive vibration dampener of the aforesaid type in which the displacement of inertial masses during the transition from rest to motion and vice versa will not result in an impermissible clanging sound.

This object, as well as other objects which will become apparent from the discussion that follows, are achieved, in accordance with the present invention by providing a speed-adaptive vibration dampener of the aforesaid type in which bolts extend through a guide toward the sides facing away from the associated arcs. The bolts begin to be supported by the guides on the side facing away from the arcs as soon as a low speed level has been exceeded and before a high relative speed has been attained. Clanging is therefore maintained at acceptable levels in all relevant situations.

Clanging can be reduced even further if the guides are made of a polymeric material, specifically polyurethane or polyamide for example.

Alternatively, an elastomer can be employed. The resilience of such a material ensures particularly effective noise reduction.

The vibration suppressing layers can terminate along the circumference on each side in catches that limit the motion of the bolts along the circumference to a specific extent. The slot that each bolt can accordingly move within is kidney shaped. It is initially demarcated by the arcs that the bolts roll along, then by the guides that support the bolts while the vibration dampener is at rest, and finally on both sides along the circumference by the catches that limit the motion of the bolts. All these sections merge smoothly, ideally eliminating sudden changes in direction.

The arcs and guides can be components of insert parts that clip into recesses in the collar or in the inertial masses or both. They can be modified in size and shape, allowing each vibration dampener to be ideally adapted to various applications. Assembly is very simple. They can also just be inserted into the recesses and secured there with cement, screws, or rivets.

It has been demonstrated to be particularly reliable for the vibration suppressing layer to be applied to the arc-supporting insert pieces and recesses by direct molding and curing of the material they are made of. There are extra advantages to applying the adhesive to both halves in this case, in the compensation of tolerances between the insert pieces and the recesses and in the immobility of the insert pieces with the recesses. The vibration-suppressing layer material can be injected and cured.

For a full understanding of the present invention, reference should now be made to the following detailed description of the preferred embodiments of the invention as illustrated in the accompanying drawings.

DESCRIPTION OF THE PREFERRED EMBODIMENTS

Figure 1:
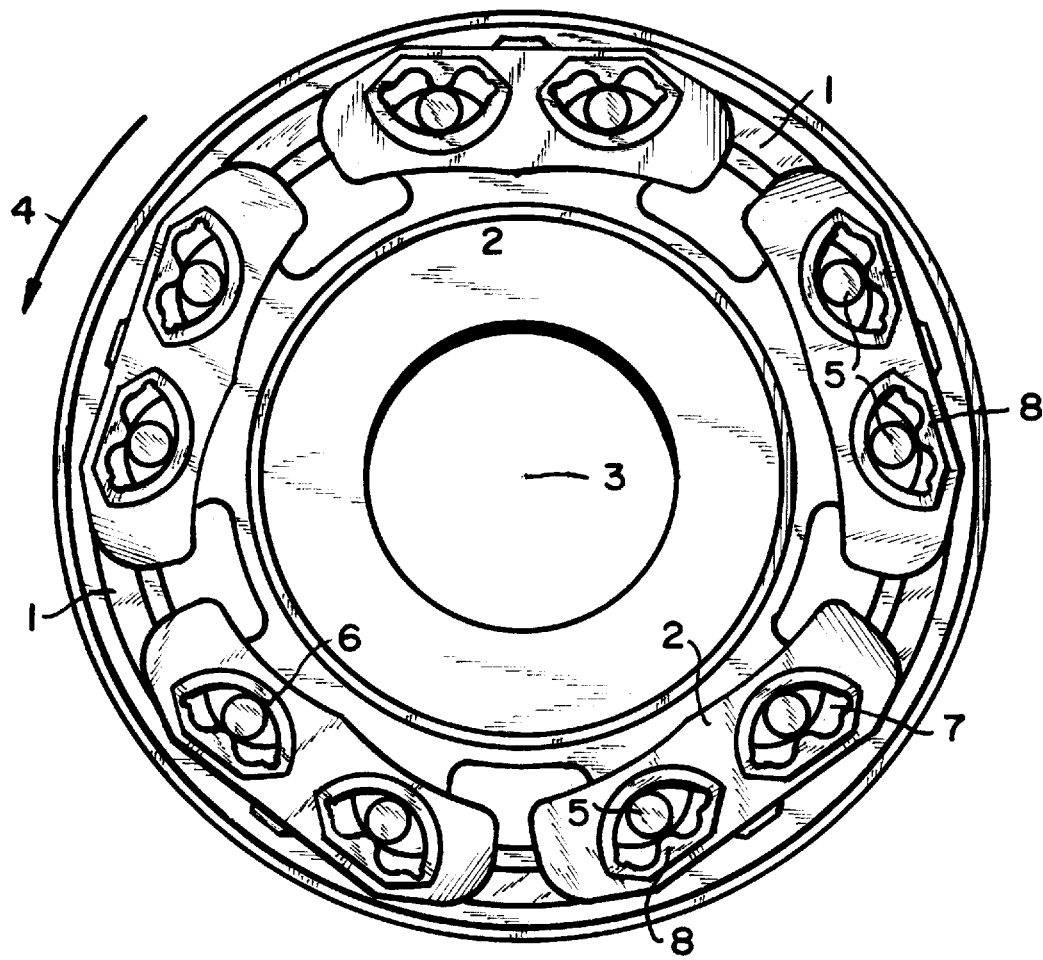
FIG. 1 is a front view of the preferred embodiment of a speed-adaptive vibration dampener according to the invention.

The preferred embodiments of the present invention will now be described with reference to FIGS. 1–3 of the drawings. Identical elements in the various figures are designated with the same reference numerals.

The speed-adaptive vibration dampener illustrated in the accompanying drawings comprises a hub or drive collar 1 and several inertial masses 2. Collar 1 rotates around a central axis 3. Each inertial mass 2 pivots around a peripheral axis equidistant from central axis 3, more or less accompanying the device's overall rotation 4. Each inertial mass 2 is secured in collar 1 by two bolts 5. Bolts 5 are distributed along the device's circumference and extend parallel to central axis 3. The bolts roll back and forth along arcs 6. Arcs 6 are concave toward central axis 3 in the vicinity of collar 1 and concave in the opposite direction in the vicinity of inertial masses 2. The bolts 5 extend through guides 7 toward the sides facing away from the associated arcs. Each guide 7 consists of a layer 8 of polymer, rubber for instance. The guides are demarcated on each side by catches 9 that also limit the circumferential motion of each bolt. The bolts are wide enough in relation to the radial separation between each arc and its associated guide to eliminate any, or at least any significant play.

Arcs 6 and guide 7 are components of insert parts permanently maintained by clips or otherwise in recesses 10 in the collar 1 and inertial masses 2. The extent of the recesses 10 in the inertial masses 2 are illustrated in FIG. 2 by broken lines. The inertial masses can also have a different shape, rectangular for example, than that shown in FIG. 2. Although rectangular inertial masses are easier to manufacture, they necessitate a reduction in the theoretically attainable overall mass.

Figure 2:
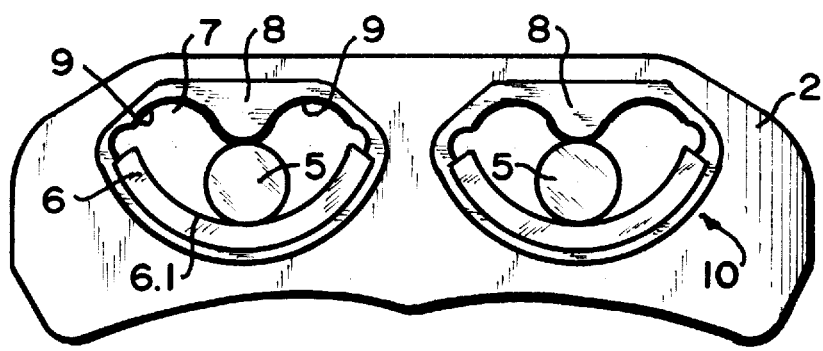
FIG. 2 is a detailed view of an insert piece that can be introduced into the collar of the vibration dampener illustrated in FIG. 1.

The insert pieces 6.1 and 6.2 that constitute arcs 6 can also be accommodated loosely in the recesses 10 and fused into place when the vibration suppression layers 8 that support the guides 7 are molded to the recesses and to insert pieces 6.1 as illustrated in FIG. 2. The result is not only a tight and secure seat for the insert pieces but also an absolutely precise association between the arcs and guides and the inertial masses or central axis 3. Any undesirable imbalance of the rotating vibration dampener will accordingly be counteracted. It has been demonstrated to be particularly practical for the insert pieces to be extruded. Such pieces are distinguished by their particularly excellent surface quality. The recesses, on the other hand, can be stamped out. Any observable surface imprecision will be automatically taken care of when the vibration-suppression layers 8 are molded in.

Figure 3:
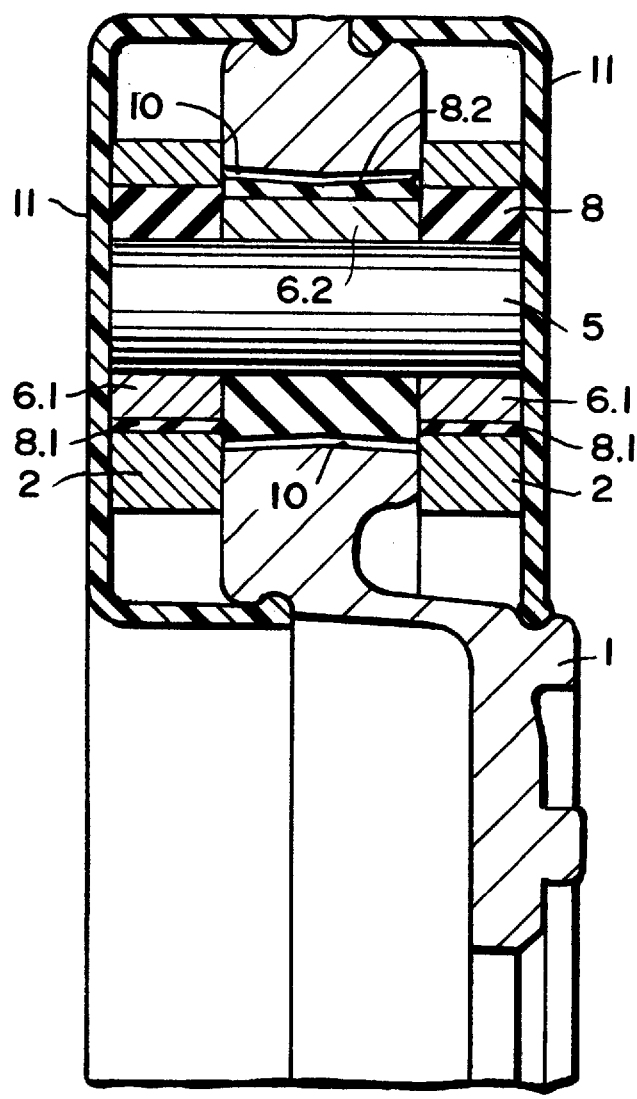
FIG. 3 is a cross-sectional view through a portion of the speed-adaptive vibration dampener of FIG. 1.

The drive collar 1 in the embodiment illustrated in FIG. 1 through 3 incorporates a flange in the vicinity of its outer circumference, with the inertial masses 2 on both sides axially adjacent thereto. The masses are mounted in the collar 1 on bolts 5 that extend radially through a guide 7 on the side facing away from the particular arc 6 and are radially supported.

The bolts 5 are cylindrical. They can also be tubular, if desired. They are prevented from escaping axially by plastic caps 11 secured tight against the collar 1 and covering each end of the bolts. Inertial masses 2 are accommodated in the remaining space 12. They, as well as the bolts, are prevented from displacing axially in relation to the collar 1 by the caps 11, as illustrated in FIG. 3. The caps can also be made of metal.

The speed-adaptive vibration dampener in accordance with the present invention is intended to insure that the radial distance between inertial masses 2 and central axis 3 will constantly vary as bolts 5 roll over arcs 6, eliminating vibrations throughout the whole range of speeds.

There has thus been shown and described a novel speed-adaptive vibration dampener which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A vibration dampener that adapts to different speeds of rotation, comprising a drive collar and several inertial masses arranged thereon, wherein the collar rotates around a central axis and the inertial masses pivot about peripheral axes in the direction of rotation, wherein each inertial mass is secured to the collar by a pair of bolts extending parallel to the central axis, distributed around the circumference of the collar, and which roll back and forth along arcs, wherein the arcs are concave toward the central axis in a vicinity of the collar and concave in an opposite direction in a vicinity of the inertial masses, and wherein each pair of bolts extends through a guide toward the sides facing away from the associated arcs.

2. The vibration dampener defined in claim 1, wherein each guide is formed of a vibration-suppressing layer of polymeric material.

3. The vibration dampener defined in claim 1, wherein the vibration-suppressing layer is elastomeric.

4. The vibration dampener defined in claim 2, wherein the vibration-suppressing layer terminates in both circumferential directions with stop surfaces that limit the circumferential motion of the bolts to a specific amount.

5. The vibration dampener defined in claim 2, wherein each arc is formed by insert pieces.

6. The vibration dampener defined in claim 5, wherein the insert pieces and the vibration-suppressing layers are components of insert parts accommodated tightly in recesses in at least one of the collar and the inertial masses.

7. The vibration dampener defined in claim 6, wherein the material constituting the vibration-suppressing layers is connected to the recesses and insert pieces by direct molding and curing subsequent to introduction of the insert pieces into the recesses.

8. The vibration dampener defined in claim 6, comprising a space between one of the inertial masses and collar and the insert pieces and wherein the space is occupied by the material of the vibration suppression layer, thereby forming a tolerance layer.

9. The vibration dampener defined in claim 8, wherein the tolerance layer and the vibration-suppressing layers are integrated and merge into each other.

10. The vibration dampener defined in claim 5, wherein the insert pieces are extruded.

* * * * *